United States Patent [19]

Breen

[11] Patent Number: 4,861,158

[45] Date of Patent: Aug. 29, 1989

[54] CHIRP AND DOPPLER OPTICAL GAUGE

[75] Inventor: Michael T. Breen, Garden City, Mich.

[73] Assignee: Eaton Corporation, Cleveland, Ohio

[21] Appl. No.: 103,086

[22] Filed: Sep. 30, 1987

[51] Int. Cl.$^4$ ................................................ G01C 3/08
[52] U.S. Cl. .......................................... 356/5; 342/83; 342/84; 342/99; 342/132; 356/28.5
[58] Field of Search ..................... 356/5, 28.5; 342/83, 342/84, 99, 132

[56] References Cited

U.S. PATENT DOCUMENTS 4,167,329 9/1979 Jelalian et al. .......................... 356/5
4,721,385 1/1988 Jelalian et al. .......................... 356/5

Primary Examiner—Stephen C. Buczinski
Attorney, Agent, or Firm—C. H. Grace

[57] ABSTRACT

A laser distance gauge measures the distance and shape of a target by alternately performing (a) a Doppler shift measurement during optical scanning of the target's surface and/or motion of the target and (b) a chirp measurement with a chirp frequency laser signal. To ascertain changes in radial distance from the gauge to the target, the Doppler shift information is integrated and the result is combined with absolute distance measurements made in the chirp mode. A single CW laser, which operates single frequency, serves for both types of measurement. A computer changes the gauge from Doppler mode to chirp mode when the Doppler shift reaches a predetermined amount. When a chirp measurement of absolute distance is completed it reverts to Doppler mode.

16 Claims, 1 Drawing Sheet

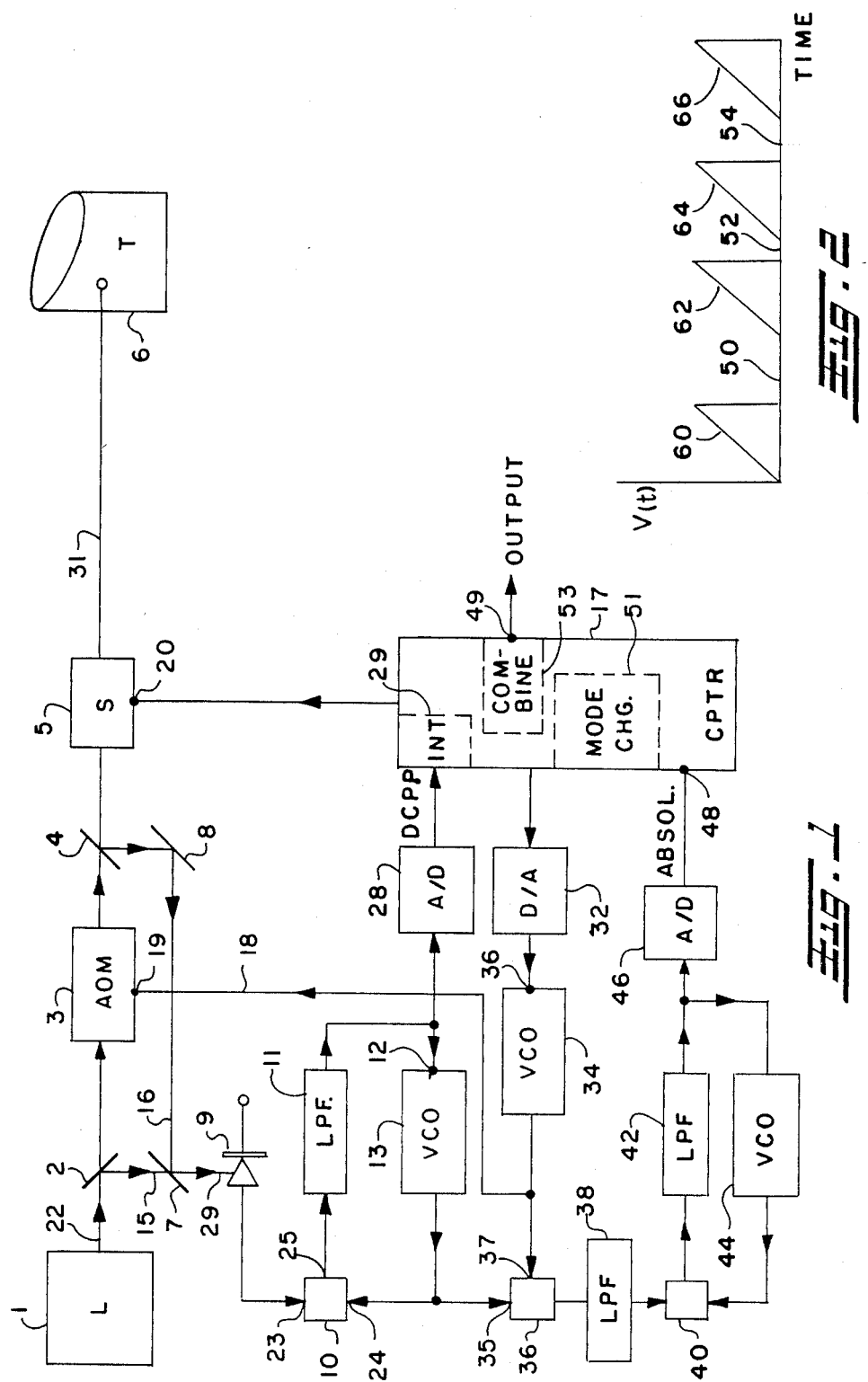

4,861,158

CHIRP AND DOPPLER OPTICAL GAUGE

CROSS-REFERENCES TO RELATED APPLICATIONS

This application is one of a group of related applications that were filed simultaneously on Sept. 30, 1987, including Ser. No. 103,085, Ser. No. 103,087, Ser. No. 103,088, and Ser. No. 103,092.

FIELD

The invention relates to measurement by laser of the shape of an object and the distance to it, by a combination of both Doppler and chirp techniques.

PRIOR ART

Many combined Doppler and chirp gauging systems of the prior art require two lasers for their operation, and many chirp systems require mode locking of the laser to achieve the necessary accuracy. Various systems including radar systems have previously used the chirp concept, which involves rapid sweeping of the beams's frequency.

SUMMARY

The invention is a distance gauging system that operates alternately in two modes based upon different principles. It uses apparatus in common between the modes, and automatically switches from one mode to the other in response to the data itself. One of its principles of operation is based on Doppler shift measurement, followed by integration. The other is chirp measurement of absolute distance.

When the system is operating in the Doppler mode, and the Doppler data reach a predetermined limit, a computer switches the system from the Doppler mode to the chirp mode, in which it makes an updated absolute distance measurement based upon chirp. The system requires only one laser, which operates single frequency. It is potentially simpler than many prior systems, and very sensitive, partly because it employs coherent detection.

An object of the invention is to provide a system in which a Doppler shift due to the target is nulled out by feedback.

Another object is to provide a system in which the Doppler shift received at the processing circuits is nulled out by frequency modulating the laser beam before it goes out to the target, or alternatively by frequency modulating the reference beam. Thus, an object of the invention is to provide a closed optical loop Doppler gauge by feeding back an electronic signal to control an acoustooptical modulator in a reference beam channel. Another object is to provide a closed optical loop Doppler gauge by feeding back an electronic signal to control an acoustooptical modulator in a target beam channel.

Another object is to obtain, in a Doppler system, a difference signal that results from heterodyning the reference beam (after acoustooptical modulation), with a target return beam, and tracking the difference signal by means of a phase locked loop.

Another object is to provide a chirp laser system for measuring absolute distance to a target.

Another object is to provide a combined chirp system and Doppler system, for combining absolute distance measurements and very accurate relative distance measurements to produce unitary output information that is both absolute and accurate.

Another object is provide a time sharing system in which one laser serves for both absolute distance measurements and Doppler (relative) distance measurements.

Another object is to provide a system for measuring in two modes, and in which the system changes in a timely manner from one mode to the other in response to the data itself.

BRIEF DESCRIPTION OF DRAWINGS

FIG. 1 is a block diagram of a preferred embodiment of the invented dual mode Doppler and chirp gauging system.

FIG. 2 is a waveform graph (as a function of time), of a voltage used in frequency modulating an acoustooptic modulator of the foregoing block diagram.

DETAILED DESCRIPTION

The invention is illustrated by a surface shape measuring gauge which is operated in two modes alternately. One mode of operation, which is based upon a Doppler principle, measures rate of change of radial distance to the target. The other mode employs a frequency modulated ramp (chirp) laser signal for absolute distance measurement by chirp signal. The data results of the two modes are then combined in a computer.

Doppler Mode

A preferred embodiment of the gauge is shown in FIG. 1. During Doppler mode operation, a single frequency He-Ne laser 1 (wavelength 6328 Angstroms) sends a continuous wave beam 22 to a beam splitter 2. A portion of the energy of the original laser beam 22 is redirected by the beam splitter 2 to serve as a reference beam 15. It passes directly through a beam splitter 7. There, it joins reflected energy 16 from the target to form a composite beam 29, which propagates toward a photodiode 9.

A second portion of the original laser beam 22 passes directly through the beam splitter 2 and into an acoustooptical modulator 3. The modulator 3 is preferably a Raman-Nath cell, which is capable of frequency modulating a portion of the beams's energy in accordance with the frequency of a signal applied to a modulation input terminal 19. The modulator 3 emits a frequency-modulated wave at its output. In the Doppler mode the modulation signal at terminal 19 has a constant frequency of 40 MHz.

The output beam of the modulator 3, which is offset from the frequency of beam 22 by a steady 40 MHz, passes directly through a second beam splitter 4, and into a two axis optical beam scanner 5, which can deflect the beam angularly in two coordinates. Deflections produced by the scanner 5 are controlled by signals which it receives at terminals 20 from a computer 17. At the output of the scanner 5, a deflected beam 31 propagates (in a direction most easily envisioned in spherical coordinates) toward a target object 6, from which it is reflected or scattered.

The frequency of the reflected or backscattered wave can change because of Doppler effect as the beam 31 scans the object 6, even if the object is stationary. Doppler frequency shift can occur because of variations in the radial distance of the reflection spot from the scanner 5 due to the surface contours of the target 6.

A portion of the return energy coherently reflected from the target object traverses the scanner 5 and strikes the beam splitter 4, where it is redirected. The redirected beam then reflects from a mirror 8 and proceeds as beam 16 to the beam splitter 7. The beam 16 is redirected by beam splitter 7 toward the photodiode 9. The reference component and the target return component of the composite beam 29 interfere with each other as they propagate to the photodiode 9, and their composite envelope exhibits an optical beat phenomenon in both space and time. Beam 29 falls upon the photovoltaic square law detector 9, which is an RCA C30952F PIN diode hybrid bipolar amplifier.

As photodiode 9 receives the light beam 29 on its photosensitive surface it develops an electrical output signal in accordance with the envelope of that light. One beat frequency of this optical heterodyning action is the frequency difference between the reference beam component and the return beam component. From the photodiode 9, the resulting electrical signal is conducted to a first input terminal 23 of a phase comparator 10. The frequency of this difference signal is the 40 MHz offset introduced to the beam in modulator 3, plus (algebraically) the Doppler shift frequency that is to be measured.

Another input terminal 24 of the phase comparator 10 receives a signal from a voltage controlled oscillator 13, (VCO). The phase comparator 10, a filter 11, and the VCO 13 comprise a phase locked loop. Phase comparator 10 can be a Mini Circuits Lab SRA-3 double balanced phase comparator. A second heterodyne action occurs, this time an electrical circuit action, in the phase comparator 10. It produces an output signal, which appears at a terminal 25 of the phase comparator 10 and is conducted to the low pass filter 11. Of the heterodyne products, only the difference frequency between the signals at inputs 23 and 24 has a low enough frequency to be transmitted through the filter 11.

To control the frequency and phase of the VCO 13, the voltage at the output of the filter 11 is connected to a frequency-controlling input terminal 12 of the VCO 13. The loop 10, 11, 13 applies a VCO output frequency, which tracks the frequency of terminal 23, to terminal 24 of phase comparator 10. The VCO preferable produces a sinusoidal output waveform. After locking-on of the loop is achieved, the frequency of the signal at 24 equals the frequency at terminal 23. It is a sum of 40 MHz and the Doppler shift. The free-running frequency of VCO 13 would be 40 MHz; the Doppler shift component of frequency at terminal 24 is also provided by VCO 13, in response to a phase error signal from the phase comparator terminal 25, via filter 11.

To provide Doppler data from the loop, the output signal from the low pass filter 11 is connected also to the input of an analog to digital converter (A/D) 28. The digital output of A/D 28 is input to the computer 17. In computer 17, the Doppler data may be integrated if desired, preferably under software-controlled procedures, to produce data indicative of the radial distance from the gauge to the target relative to some absolute starting distance.

Clearly, a different type of frequency discriminator, (other than the phase locked loop 10, 11, 13), could be employed to extract the Doppler shift data from the reflected signal, within the concepts of the invention, to achieve a desired level of accuracy.

Chirp Mode

In the chirp mode of operation the same laser 1 produces the beam 22, and a component of the beam is sent via splitters 2 and 7 to the photodiode 9, as before. Another component goes to acoustooptical modulator 3, and is frequency modulated in accordance with a frequency signal at terminal 19. In the chirp mode, the signal at 13 has a linearly increasing ramp frequency that is controlled by a voltage V(t) shown in FIG. 2. Time intervals 50, 52, and 54 of the voltage waveform V(t) are Doppler mode intervals. Time intervals 60, 62, 64, and 66 are chirp mode intervals.

The waveform V(t) is preferably generated by the computer 17 in digital form. A digital to analog converter (D/A) 32 converts it to the waveform of FIG. 2, at a terminal 36. As the voltage in the time interval 60 rises, the output frequency of a VCO 34 rises in response to it. VCO 34 also has a convenient offset frequency of about 40 MHz, which it adds to the ramp frequency. The output of VCO 34 drives the modulating input terminal 19 of modulator 3. An output beam from the Raman-Nath cell 3 passes through splitter 4 to scanner 5.

During the chirp intervals, the scanning signals at terminals 20 of the scanner 5 are constant. The computer 17 stops the beam 31 from scanning during the chirp measurements, to prevent measure errors from arising from Doppler shift.

Beam 31 varies upward in frequency during the chirp interval. The return target beam 16 varies upward in frequency in the same way, after a time delay whose amount depends upon the distance to the target. However, at any instant, the beam that has returned from the target after reflection has a lower frequency than the outbound beam, because time was required for it to traverse the round trip distance from splitter 4 to target 6 and back to splitter 4. During that travel time, the ramp frequency of the signal passing outbound through splitter 4 increased somewhat. The recent history (for that travel time interval), of the frequency of the outbound wave at splitter 4 is represented by the slightly varying frequency of the wave cycles that are distributed (at any instant) along the round trip beam path. The output of photodiode 9 is swept upward in frequency after that same time delay, because the reference beam 15, with which beam 16 is mixed, has constant frequency.

The absolute range to a spot on the target 6 is indicated by the frequency difference between the outbound beam and the target return beam. For example, if the radial distance from the splitter 4 to target 6 happens to be constant at a particular time, the difference between the frequency of the outbound wave at 4 and the frequency of the return wave at 4 is constant. That difference is affected by the ramping rate and the round trip time, and therefore by the distance (if constant propagation velocity is assumed), from the gauge to the target and back. This difference in frequency is measured in a manner described below to ascertain the absolute distance from gauge to target. Various delays and offsets in the system must be compensated by calibration.

After it is reflected from splitter 4, mirror 8, and splitter 7, the return beam joins the constant frequency reference beam and falls upon the diode detector 9. Although in this stationary target example the frequency difference between the outbound and return waves at splitter 4 is more or less constant, the frequency difference between the return wave 16 and the reference wave 15 is a linearly time-varying ramp plus the offset of about 40 MHz. The output of the diode 9 is therefore a delayed frequency ramp plus 40 MHz; this is applied to terminal 23 of the phase comparator 10.

The signal from the output of VCO 13 merely copies that at terminal 23, phase coherently. This signal is applied to an input 35 of a phase comparator 36; the phase comparator 36 has another input 37 that is driven by the output of VCO 34. A comparison can therefore be made in phase comparator 36 between the return signal frequency and the outgoing signal frequency, because VCO 34 is the source of ramp modulation for modulator 3.

Mixer 36 outputs a difference frequency, which is the desired indication of the absolute distance to the target. A low pass filter 38 transmits the difference frequency and blocks other frequencies. The output frequency of filter 38, which indicates the absolute distance to the target, can be put in more convenient form if desired by converting it to a voltage proportional to frequency. A frequency discriminator of any of various types could be used; in the embodiment being described, a phase locked loop is employed. It consists of a phase comparator 40, a low pass filter 42, and a voltage controlled oscillator 44. The VCO 44 feeds back to the phase comparator 40 so as to equal the frequency of the signal from filter 38.

Output data is obtained from an analog to digital converter 46 that receives a signal from filter 42 and converts it to data suitable for the computer 17, terminal 48. With appropriate calibration, the data at terminal 48 show the absolute distance to the target 6.

Mode Switching

During operation of the system to determine the contour of the target object 6, the gauge switches back and forth under computer control from a Doppler mode for measurement of the rate at which the radial distance to the reflection spot is changing, and a chirp mode for absolute radial distance measurements.

Several functions are performed by the computer 17. It controls the deflections in the optical scanner 5, integrates the output data obtained in the Doppler mode, interprets the data obtained in the chirp mode, determines the appropriate time to change from one mode to the other, generates the modulation waveform V(t) of FIG. 2 for the system's two modes of operation, and combines the data obtained from the two modes into a description of the object 6.

The computer selects the times during which the gauge will function in each mode, on the basis of recent data. The system operates in the Doppler mode until the bandwidth limit for maintaining lock of the phase locked loop 10, 11, 13 has been reached. Then it changes to the chirp mode to make a fresh measurement of the absolute distance to the spot on the object that is instantaneously being illuminated. After the absolute range has been determined by the chirp technique, the computer changes the operation back to the Doppler technique. Mode changes are executed under the control of software, as indicated by the dotted rectangle 51 in the computer 17 of FIG. 1.

The computer integrates the Doppler motion data to produce radial distance data, and algebraically adds it to the most recent absolute distance measurement previously obtained in the chirp mode. This is preferably done under software instructions, as indicated by the dotted rectangle 53 of FIG. 1. Final output data are available from the illustrated embodiment at a terminal 49 of the computer 17. Many variations of the invention are possible within the scope of the claims.

What is claimed is:

1. A gauge for measuring the distance to a place on an object by (a) a Doppler principle to measure rate of change of distance, and (b) a chirp principle to measure absolute distance, with both the Doppler and chirp principles being employed over the same span of distances, comprising:
   a laser producing a laser beam;
   means receiving at least some energy from said laser beam for providing a reference beam based upon said laser beam;
   means receiving at least a portion of the beam of said laser for providing a constant frequency signal beam;
   means for controllably directing the constant frequency signal beam to the object for reflection;
   means for receiving from said object coherent reflected energy; and,
   (a) for Doppler measurement,
   said reflected energy having a Doppler shifted frequency in accordance with the time rate of change of distance to the places at which reflection is occurring;
   means for measuring the Doppler shift of said reflected energy relative to said reference beam to ascertain the rate of change of distance to the place of reflection, and;
   (b) for chirp absolute distance measurement,
   said means receiving at least a portion of said laser beam comprising means for frequency modulating it as a function of time to serve as a signal beam of modulated frequency;
   means for measuring the frequency difference between said reference beam and said reflected energy to derive indicia of the distance to the place of reflection on said object, based upon the elapsed propagation time of the signal beam to the place of reflection and back.

2. A gauge as in claim 1, and further comprising:
   means receiving, from said Doppler shift measuring means, a Doppler shift data signal, for integrating said rate of change to derive incremental distance information; and,
   means for combining said incremental distance information with said indicia of the distance to said place of reflection, to produce surface shape and location data regarding the object.

3. A gauge as in claim 1, and wherein said means for frequency modulating comprises means for modulating the frequency as a linear ramp function of time.

4. A gauge as in claim 1, and wherein both said means for measuring the frequency difference and said means for measuring the Doppler shift comprise means for measuring by phase-coherent measurement techniques.

5. A gauge as in claim 1, and further comprising means arranged for monitoring the Doppler shift frequency and comparing it with a predetermined amount of frequency shift; and,
   means for terminating said Doppler measurement when the Doppler shift reaches the predetermined amount of frequency shift; and means responsive to the termination of Doppler measurement for starting the absolute distance measurement.

6. A gauge as in claim 1 and further comprising:

means responsive to said means for measuring a frequency difference for recognizing when said measurement of absolute distance is completed; and, means for terminating said absolute distance measurement thereafter; and, means responsive to said termination of absolute distance measurement for starting said Doppler measurement.

7. A laser method for measuring the distance to a place on an object by two techniques, namely, (a) a Doppler technique to measure rates of change of distance, and (b) a chirp technique to measure absolute distances, with both the Doppler and chirp techniques being employed over the same span of distances, comprising the steps of:

providing a beam from a laser;

providing a reference beam from at least a portion of said laser beam;

providing a signal beam from at least a portion of the beam of said laser;

controllably directing the signal beam to the object for reflection;

receiving coherent energy reflected from the object; and, (a) for Doppler measurement, said step of providing a signal beam comprising providing a constant frequency beam, said reflected energy having a Doppler shifted frequency in accordance with the time rate of change of distance to the place at which reflection is occurring;

measuring the Doppler shift of said reflected energy relative to said reference beam to ascertain the rate of change of the distance to the place of reflection; and, (b) for absolute distance measurement, said step of providing a signal beam also comprising providing a beam that is frequency modulated as a function of time and therefore providing signal beam of modulated frequency;

measuring the frequency difference between said reference beam and said reflected energy to derive indicia of the distance to the place of reflection on said object, based upon the elapsed propagation time of the signal beam to the place of reflection and back.

8. A method as in claim 7, and further comprising:

a step, after said step of measuring the Doppler shift, of integrating said rate of change, to derive incremental distance information; and, a step thereafter of combining said incremental distance information with said indicia of the distance to said place of reflection, to produce surface shape and location data regarding the object.

9. A method as in claim 7 and wherein said step of providing a frequency modulated beam comprises providing a beam that is frequency modulated as a linear ramp function of time.

10. A method as in claim 7, and wherein both said step of measuring the frequency difference and said step of measuring the Doppler shift comprise steps of measuring by phase-coherent measurement techniques.

11. A method as in claim 10, and wherein said steps of measuring by phase-coherent measurement techniques include tracking data signals in at least one of said two measurement modes with a phase locked loop.

12. A method as in claim 11, and wherein said Doppler measurement is terminated when the frequency of the phase locked loop reaches a predetermined maximum frequency.

13. A method as in claim 7, and wherein said step of controllably directing the constant frequency signal beam to the object for reflection comprises a step of directing the constant frequency signal beam under the directional control of an optical scanner.

14. A method as in claim 7, and wherein said step of providing a signal beam of modulated frequency comprises subjecting said beam to a Raman-Nath cell frequency modulator and providing a modulating signal to said frequency modulator to control the modulation.

15. A method as in claim 7, and wherein said step of providing a constant frequency signal beam comprises passing said beam through a frequency modulator.

16. A method as in claim 7, and wherein said step of providing a reference beam from at least a portion of the energy of said laser beam comprises directing said laser beam to a beam splitter, and utilizing one output beam thereof as said reference beam and utilizing another output beam thereof as said signal beam.

* * * * *